（12） United States Patent
Ookubo et al.

(10) Patent No.: US 9,073,503 B2
(45) Date of Patent: Jul. 7, 2015

(54) FRONT STRUCTURE OF VEHICLE BODY

(71) Applicant: NISSAN MOTOR CO., LTD., Yokohama-shi, Kanagawa (JP)

(72) Inventors: Takao Ookubo, Atsugi (JP); Hiroyuki Ide, Hiratsuka (JP); Kiyoto Shima, Hadano (JP); Takeshi Ogata, Hadano (JP); Masaya Watanabe, Isehara (JP); Hisayasu Itou, Atsugi (JP); Toshinori Nishida, Atsugi (JP); Hironari Jo, Chigasaki (JP); Kiyoshi Fushikida, Hiratsuka (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/399,069

(22) PCT Filed: Apr. 12, 2013

(86) PCT No.: PCT/JP2013/061021
§ 371 (c)(1),
(2) Date: Nov. 5, 2014

(87) PCT Pub. No.: WO2013/172132
PCT Pub. Date: Nov. 21, 2013

(65) Prior Publication Data
US 2015/0115653 A1 Apr. 30, 2015

(30) Foreign Application Priority Data
May 18, 2012 (JP) .................................. 2012-114079

(51) Int. Cl.
B60K 5/04 (2006.01)
B60R 19/18 (2006.01)
B62D 25/08 (2006.01)

(52) U.S. Cl.
CPC .............. *B60R 19/18* (2013.01); *B62D 25/082* (2013.01); *B60R 2019/1866* (2013.01)

(58) Field of Classification Search
CPC ........... B60R 19/18; B60R 2019/1866; B62D 25/082
USPC ........................................ 296/187.01, 187.03
See application file for complete search history.

(56) References Cited

U.S. PATENT DOCUMENTS 7,284,788 B1 * 10/2007 Barbat et al. .............. 296/187.09
8,991,903 B1 * 3/2015 Alavandi et al. ......... 296/187.09

(Continued)

FOREIGN PATENT DOCUMENTS

JP 49-012525 A 2/1974
JP 49-021833 A 2/1974

(Continued)

Primary Examiner — Pinel Romain
(74) Attorney, Agent, or Firm — Young Basile

(57) ABSTRACT

A bumper reinforce extending in the vehicle width direction is connected to front ends of side member main bodies extending in the front-rear direction of a vehicle body. The bumper reinforce is provided, at end portions thereof in the vehicle width direction, with projecting ends projecting outward in the vehicle width direction from connecting portions connecting the bumper reinforce and bumper stays. The projecting ends are each provided with a gusset extending toward the rear side of the vehicle body. A catcher is fixed to the outside surface of the side member main body on the rear side of the gusset. The catcher is located at a position corresponding to a mount portion of a side member main body serving as a fixing portion for a power train unit.

4 Claims, 7 Drawing Sheets

(56) References Cited

U.S. PATENT DOCUMENTS

| | | |
|---|---|---|
| 2004/0195862 A1 | 10/2004 | Sacki |
| 2013/0234456 A1* | 9/2013 | Brockhoff et al. ............ 293/133 |
| 2014/0035325 A1* | 2/2014 | Naito et al. .............. 296/203.02 |
| 2014/0062106 A1* | 3/2014 | Han .............................. 293/133 |
| 2014/0159420 A1* | 6/2014 | Hashimoto et al. ........ 296/187.1 |

FOREIGN PATENT DOCUMENTS

| | | |
|---|---|---|
| JP | 07187003 A | 7/1995 |
| JP | 10203411 A | 8/1998 |
| JP | 2004066932 A | 3/2004 |
| JP | 2008213739 A | 9/2008 |

* cited by examiner

FRONT STRUCTURE OF VEHICLE BODY

CROSS REFERENCE TO RELATED APPLICATION

The present application claims priority to Japanese Patent Application No. 2012-114079, filed May 18, 2012 and incorporated herein in its entirety.

TECHNICAL FIELD

The present invention relates to a front structure of a vehicle body at a periphery of a side member.

BACKGROUND

Vehicle bodies are provided with side members on both sides extending in the front-rear direction of the vehicle bodies. Here, a vehicle body may have a minimal lap collision with an obstacle from the front side on the outside of a side member in the vehicle width direction. There are known measures against such a minimal lap collision as described in Japanese Unexamined Patent Application Publication No. 2008-213739.

In Japanese Unexamined Patent Application Publication No. 2008-213739, a bumper reinforce extending in the vehicle width direction is placed at front ends of side members. In addition, reinforce extensions extend rearward from outer end portions of the bumper reinforce on both sides in the vehicle width direction. Each reinforce extension is provided with a projection projecting toward the side member. The projection comes into contact with the side member at the time of a minimal lap collision to generate proof stress, and the projection is then received by a stopper bracket formed on the side member so as to prevent the projection from shifting rearward.

SUMMARY

In the conventional front structure of the vehicle body described above, the projection of the reinforce extension is received by the stopper bracket located at a side portion of the side member. However, since the strength around the stopper bracket is not considered particularly in Japanese Unexamined Patent Application Publication No. 2008-213739, there is a risk that the stopper bracket comes off at the time of front collision, or there is a risk that the reinforce extension is not received sufficiently by the stopper bracket because a fixing portion for the stopper bracket is deformed.

An object of the present invention is to increase the strength of a receiving portion to receive a load transmission member at the time of front collision which applies a collision load to a vehicle body at a position on the outside of a side member in the vehicle width direction.

The present invention includes: side members; a bumper reinforce extending in the vehicle width direction and connected to front end portions of the side members; load transmission members projecting toward the rear side of the vehicle body and placed adjacent to end portions of the bumper reinforce on both sides in the vehicle width direction; receiving portions placed on the side members to receive the load transmission members when the load transmission members move rearward by receiving an impact load from the front side of the vehicle body; and reinforcing members placed on the side members at positions corresponding to the receiving portions.

BRIEF DESCRIPTION OF DRAWINGS

FIG. 8(a) shows a state immediately before the collision, and FIG. 8(b) shows a state after the collision.

DESCRIPTION OF EMBODIMENTS

Figure 1:
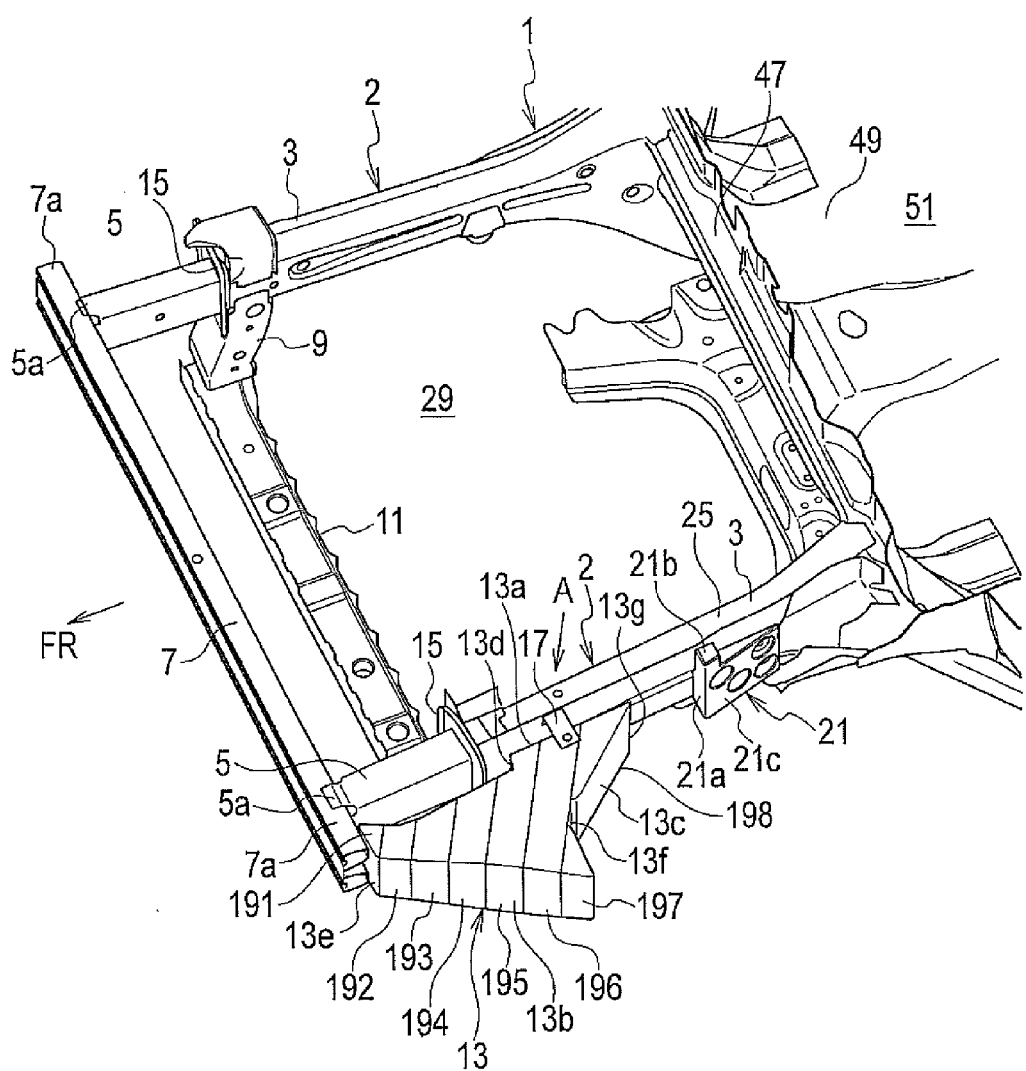
FIG. 1 is a perspective view showing a front portion of a vehicle body of a vehicle according to an embodiment of the present invention.

Hereinafter, the embodiment of the present invention will be explained with reference to the drawings. Note that "FR" in the drawings represents a front side of a vehicle.

As shown in FIG. 1, a vehicle body 1 of a vehicle according to the embodiment of the present invention includes a pair of right and left side members 2 extending in the vehicle front-rear direction at lower portions on both sides of the vehicle body. Each of the side members 2 includes a side member main body 3 and a bumper stay 5 attached to a front end of the side member main body 3, the side member main body 3 and the bumper stay 5 each extending in the vehicle front-rear direction. The respective front ends of the paired bumper stays 5 on the right and left sides are connected to each other via a bumper reinforce 7 extending in the vehicle width direction.

Each of front ends of the side member main bodies 3 (adjacent to connected portions between the side member main bodies 3 and the bumper stays 5) is provided with a coupling member 9 extending downward. In particular, upper ends of the respective coupling members 9 are fixed to lower surfaces of the respective side member main bodies 3, and lower ends of the respective coupling members 9 are connected with a cross member 11 extending in the vehicle width direction. An impact absorbing member (not shown in the figure) is attached to the front surface of the bumper reinforce 7 toward the front side of the vehicle body, and a bumper fascia (not shown in the figure) is placed on the front side of the impact absorbing member. The bumper reinforce 7, the impact absorbing member and the bumper fascia form a front bumper.

Each of outer ends on both sides of the bumper reinforce 7 in the vehicle width direction is formed into a projecting end 7a projecting outward in the vehicle width direction from a connecting portion 5a of the bumper stay 5 connected to the bumper reinforce 7. The projecting end 7a is provided, on the rear side thereof in the vehicle front-rear direction, with a front bumper gusset (hereinafter, simply referred to as a gusset) 13 serving as a load transmission member connected to the projecting end 7a by, for example, welding. The gussets 13 are provided on both right and left sides in the vehicle width direction; however, FIG. 1 shows only one gusset 13 on the left of the vehicle body, and the other gusset 13 on the right is not shown in the figure. In addition, an upper portion of the coupling member 9 located on the left in the vehicle width direction is not shown in the figure.

The front end of the gusset 13 toward the front side of the vehicle body is connected to the projecting end 7a of the bumper reinforce 7 on the rear side thereof in the vehicle front-rear direction. The gusset 13 extends from the connected portion toward the rear side of the vehicle body in such a manner as to be formed into a triangular shape in a planar view. In other words, the gusset 13 includes a width-direction inner-side surface 13a extending in the vehicle front-rear direction and facing the outside surface of each of the bumper stay 5 and the side member main body 3, a front inclined surface 13b serving as an inclined portion extending outward in the vehicle width direction from the front end thereof toward the rear side of the vehicle body, and a rear inclined surface 13c connecting the rear end of the width-direction inner-side surface 13a and the rear end of the front inclined surface 13b.

The width-direction inner-side surface 13a includes a step 13d located on the rear side of a flange connecting portion 15 in a manner such that the vehicle-width inner-side surface 13a is recessed outward in the vehicle width direction in a region on the front side of the flange connecting portion 15. The step 13d can prevent the gusset 13 from interfering with the flange connecting portion 15 located between the side member main body 3 and the bumper stay 5 when the gusset 13 moves rearward at the time of vehicle collision. A part of the gusset 13 on the rear side of the step 13d is temporarily attached to the outer side of the side member main body 3 with a temporary attachment member 17.

The front inclined surface 13b is substantially entirely flat in the front-rear direction and inclined outward in the vehicle width direction in a planar view from the front side thereof toward the rear side of the vehicle body. An end surface portion 13e extending in the vehicle width direction is formed between the front end of the front inclined surface 13b and the front end of the width-direction inner-side surface 13a. The end surface portion 13e is attached to the rear side of the projecting end 7a of the bumper reinforce 7. The rear inclined surface 13c is provided with a recess 13f substantially in the middle in the extending direction thereof.

Figure 2:
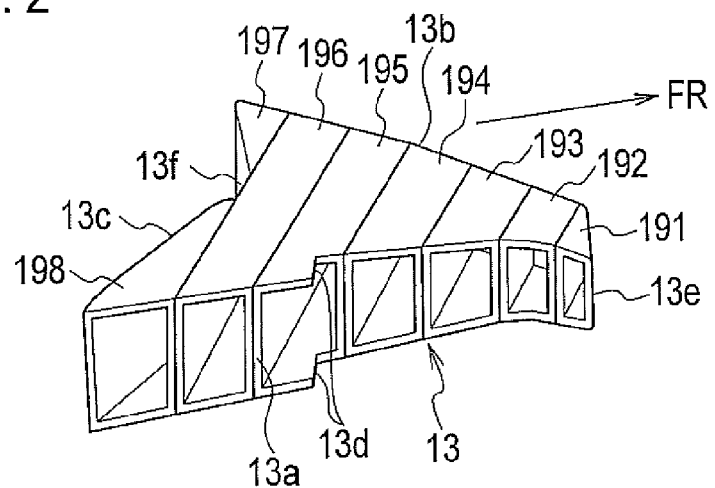
FIG. 2 is a perspective view of a gusset placed on the front portion of the vehicle body shown in FIG. 1 as viewed from the direction of arrow A in FIG. 1.

As shown in FIG. 2, the gusset 13 has a structure in which a plurality of aluminum hollow square columns 191 to 198 are connected and fixed together in the vehicle front-rear direction. The five columns of the plural square columns 191 to 198 from the column 192 located toward the front side of the vehicle body indicated by arrow FR to the column 196 located toward the rear side of the vehicle body, are each formed into a rectangular parallelepiped. These hollow columns are formed in such a manner as to be open on the inner side in the vehicle width direction (on the front side in FIG. 2) and closed on the outer side in the vehicle width direction. The respective closed portions on the outer side in the vehicle width direction form the inclined surface 13b shown in FIG. 1. The square column 195 is provided with the step 13d on the open side.

The lengths of the five square columns 192 to 196 described above gradually change from the front side to the rear side of the vehicle body in a manner such that the square column 192 located toward the front side has the shortest length and the square column 196 located toward the rear side has the greatest length. Note that the length of each column is a length in the direction from the open side to the closed side of each column.

The hollow square column 191 having a substantially triangular shape in a planar view is attached to the front side of the square column 192 located toward the front side of the vehicle body. The front surface of the square column 191 toward the front side of the vehicle body indicated by arrow FR is the end surface portion 13e shown in FIG. 1 and serves as a connected surface to the bumper reinforce 7. The square column 191 is also a hollow member which is open on the inner side in the vehicle width direction.

The square column 196 located toward the rear side of the vehicle body is provided on the rear side thereof with two square columns 197 and 198 attached in such a manner as to be separated from each other in the length direction of the square column 196. The two square columns 197 and 198 each have a triangular shape in a planar view. The square column 198 located on the inner side in the vehicle width direction is open on the inner side thereof in the same manner as the square columns 191 to 196. The square column 197 located on the outer side in the vehicle width direction is closed on the outer side thereof as shown in FIG. 1 so as to serve as a part of the inclined surface 13b described above.

The recess 13f is a part of the square column 196 exposed between the two square columns 197 and 198 and is located between the respective surfaces of the square columns 197 and 198 on the opposite side of the square column 196.

The gusset 13 may be a casting of metal such as aluminum as in the case of a catcher 21 described below, instead of being obtained in a manner such that the plural square columns are connected together.

The outside surface of the side member main body 3 on the rear side of the gusset 13 is provided with the catcher 21 serving as a receiving portion. Here, FIG. 1 shows only one catcher 21 on the left of the vehicle body, and the other catcher on the right is omitted as in the case of the gusset 13.

Figure 3:
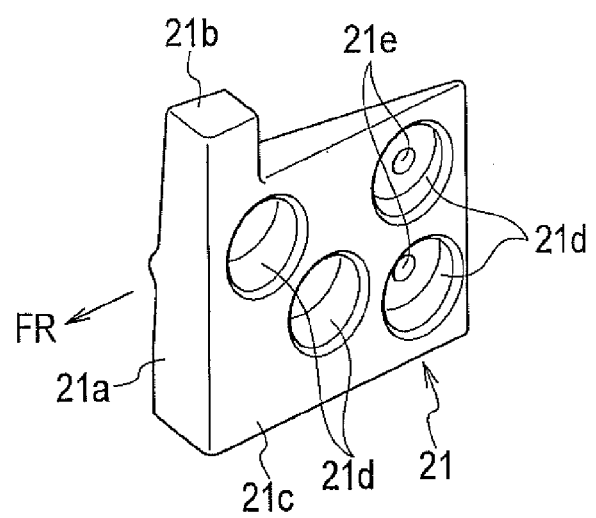
FIG. 3 is a perspective view of a catcher placed on the front portion of the vehicle body shown in FIG. 1.

As also shown in FIG. 3, the catcher 21 has a square shape as viewed from the side in the vehicle width direction. The catcher 21 also has a substantially triangular shape in a planar view as viewed in the vertical direction having a thickness in the vehicle width direction which is greater on the front side and decreases toward the rear side. The end surface of the catcher 21 toward the front side of the vehicle body having a greater thickness serves as a receiving surface 21a for receiving the gusset 13. The receiving surface 21a is provided at the upper portion thereof with a projection 21b projecting upward.

The outer side surface 21c of the catcher 21 is provided with a plurality of circular recesses 21d. The outer side surface 21c is a surface opposite to the attached surface of the catcher 21 to the side member main body 3. The recesses 21d are each provided with a bolt insertion hole 21e in the middle thereof. The catcher 21 is fastened and fixed to the side member main body 3 with bolts (not shown in the figure) inserted into the recesses 21e.

Figure 4:
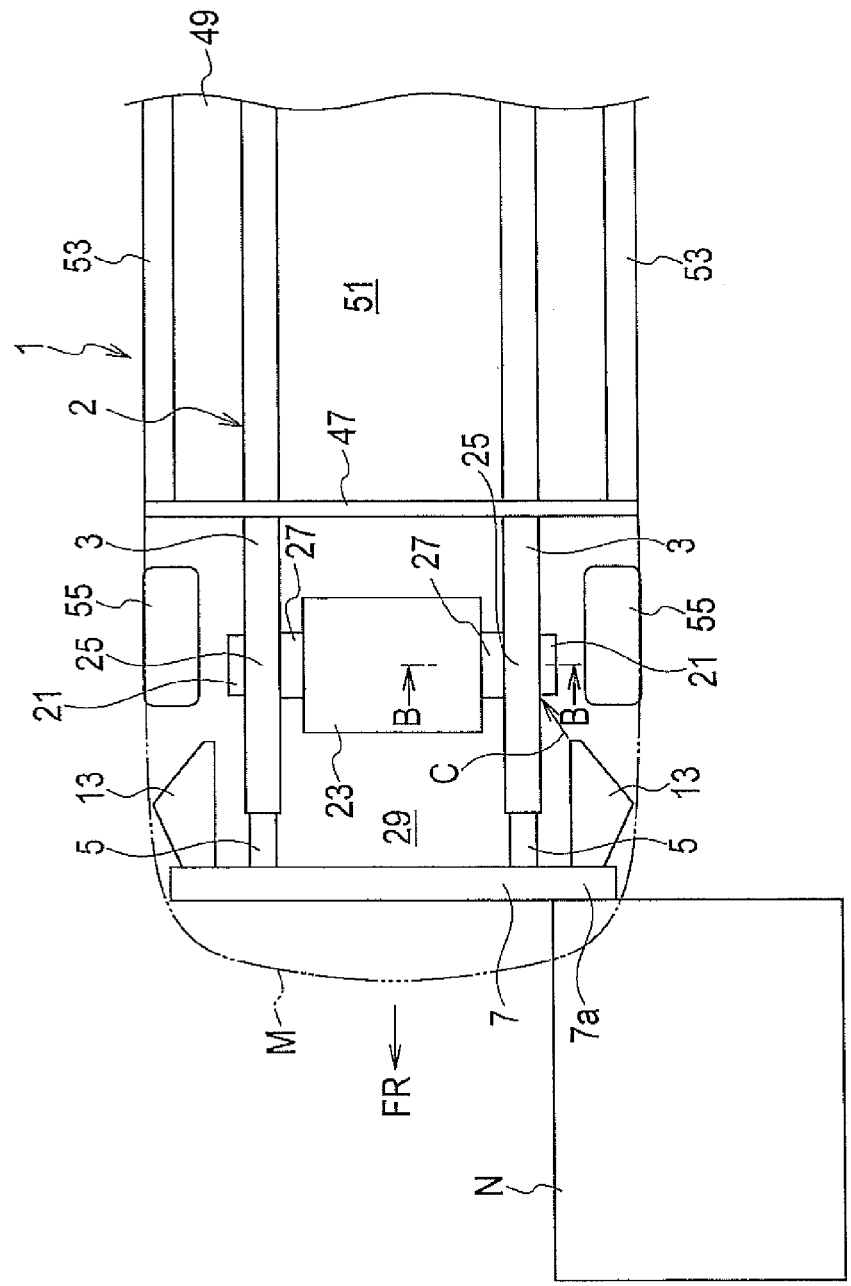
FIG. 4 is a simplified plan view showing the front portion of the vehicle body shown in FIG. 1 in a state in which an obstacle comes into collision with the vehicle body on the left on the outside of a side member in the vehicle width direction.

The attached position of the catcher 21 to the side member main body 3 corresponds to a mount portion 25 which is a fixing portion for a power train unit 23 including an engine and a transmission, as shown in FIG. 4. Note that the power train unit 23 is not shown in FIG. 1. In addition, since FIG. 4 is a simplified schematic view compared with FIG. 1, the respective components shown in FIG. 4 have slightly different shapes from those shown in FIG. 1, and FIG. 4 does not show the cross member 11 which is shown in FIG. 1.

Figure 5:
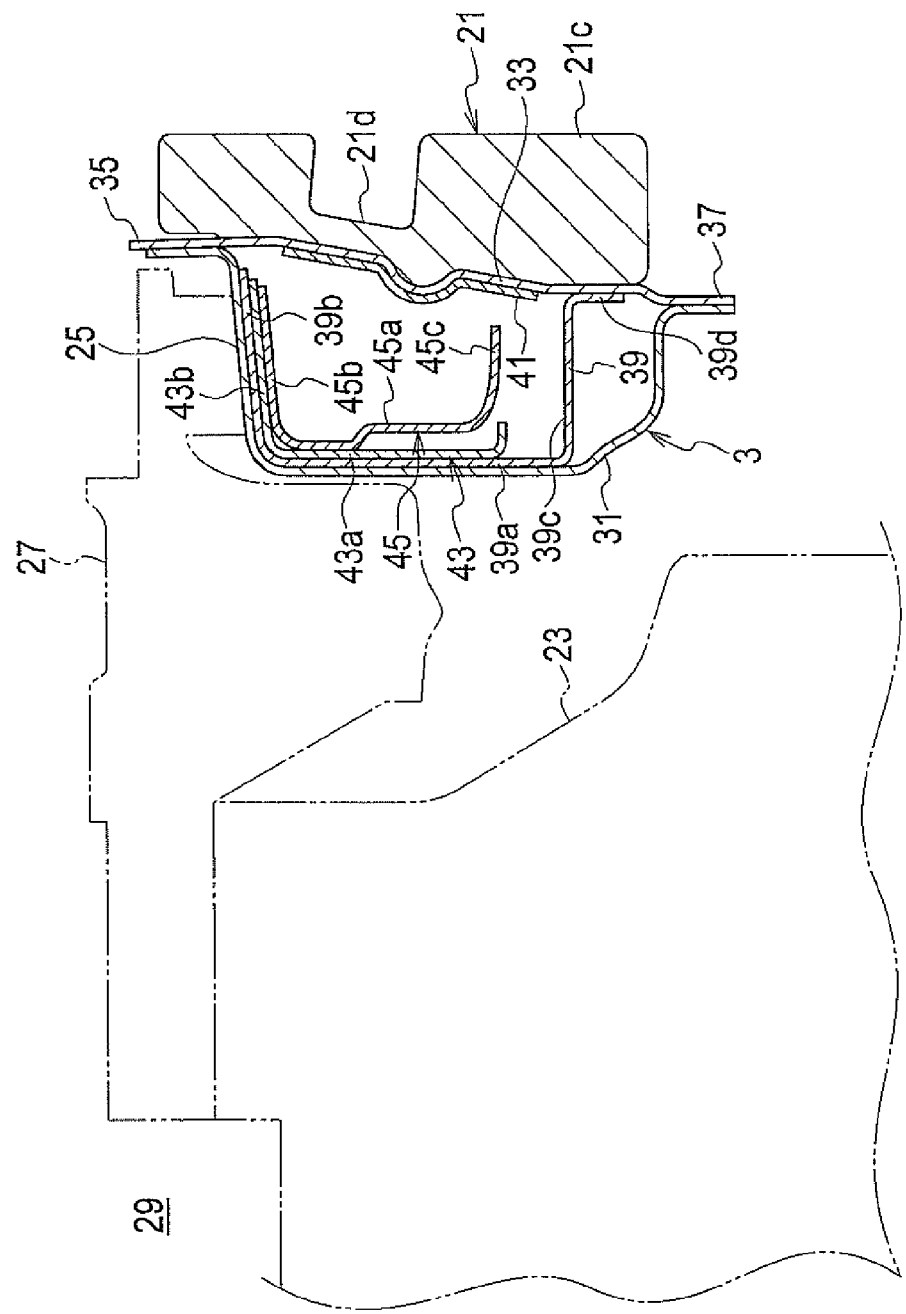
FIG. 5 is a cross-sectional view taken along the line B-B in FIG. 4.

As shown in FIG. 5 which is a cross-sectional view taken along the line B-B in FIG. 4, the power train unit 23 is fixed to the mount portion 25 of the side member main body 3 via a mount bracket 27 which is an attachment member.

As shown in FIG. 5, the side member main body 3 is obtained in a manner such that an inner panel 31 having a substantially U-shape in cross section located toward an engine compartment 29 is attached to an outer panel 33 having a substantially flat shape located on the opposite side of the engine compartment 29 interposing the inner panel 31 therebetween, and these panels are connected together via upper and lower flanges 35 and 37 so as to form a closed cross-section.

The inner panel 31 is provided on the inner surface thereof with an inner reinforce 39 having a substantially U-shape in cross section. The inner reinforce 39 includes an inner side surface 39a, an upper surface 39b and a lower surface 39c. The upper surface 39b is attached to the upper surface of the inner panel 31. A flange 39d is formed in such a manner as to extend downward from the edge of the lower surface 39c on the outer side in the vehicle width direction (on the right in FIG. 5), and is attached to the inner surface of the outer panel 33. The outer panel 33 is provided with an outer reinforce 41 attached to substantially the middle in the vertical direction on the inner surface of the outer panel 33 and including a bead in the same manner as the outer panel 33.

The side member main body 3 further includes two reinforces 43 and 45 on the inner surface of the inner reinforce 39 at a position at least corresponding to the mount portion 25. These two reinforces 43 and 45 are placed to correspond to the catcher 21 located at a position corresponding to the mount portion 25.

The reinforce 43 includes an inner side surface 43a attached to the inner side surface 39a of the inner reinforce 39 and an upper surface 43b attached to the upper surface 39b of the inner reinforce 39 so as to be formed into a substantially L-shape in cross section. The reinforce 45 includes an inner side surface 45a partly attached to the upper portion of the inner side surface 43a of the reinforce 43, an upper surface 45b attached to the upper surface 43b of the reinforce 43, and a lower surface 45c facing the lower surface 39c of the inner reinforce 39 and separated therefrom. The respective lower portions of the two reinforces 43 and 45 are attached to the inner reinforce 39 at other positions (not shown in the figure).

The inner reinforce 39, the outer reinforce 41 and the reinforces 43 and 45 described above form a reinforce member serving as a reinforcing portion to reinforce the part of the side member main body 3 corresponding to the catcher 21 serving as a receiving portion.

The strength of the reinforcing portion to which the respective reinforces 43 and 45 are attached is set to be higher than that of the other part of the side member main body 3 on the front side of the reinforcing portion.

As shown in FIG. 1 and FIG. 4, the engine compartment 29 is located toward the front side of the vehicle body, and a vehicle interior 51 is located on the rear side of the engine compartment 29. A dash panel 47 is placed between the engine compartment 29 and the vehicle interior 51. Here, the vehicle interior 51 is a space for passengers located above a floor panel 49. As shown in FIG. 4, side sills 53 extending in the vehicle front-rear direction are attached to the floor panel 49 on both sides in the vehicle width direction. Front wheels 55 are located on the front side of the side sills 53 and on the outside of the catchers 21 in the vehicle width direction.

The following is an explanation of deformation of the vehicle body 1 when a vehicle M having the vehicle body structure described above comes into collision with an obstacle N such as another vehicle from the front side of the vehicle M, as shown in FIG. 4. Here, the collision is a minimal lap collision of the vehicle body 1 with the obstacle N at a position on the outside of the side member main body 3 (in this case, the side member main body located on the left of the vehicle body) in the vehicle width direction.

Figure 6:
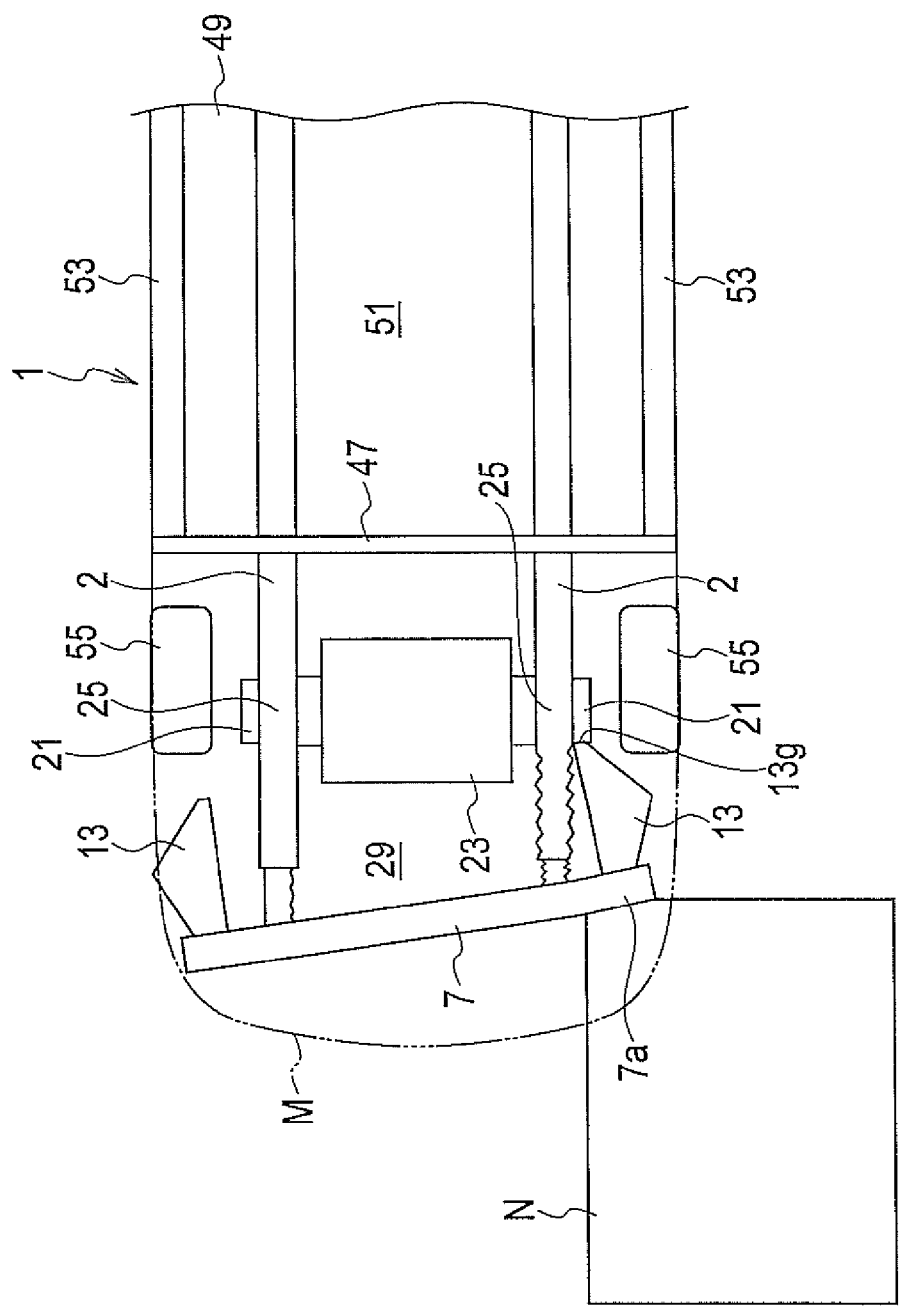
FIG. 6 is an action explanatory view showing a state in which the gusset moves rearward due to the obstacle and comes into contact with the catcher, in comparison to the state shown in FIG. 4.

As shown in FIG. 4, the obstacle N comes into collision with the projecting end 7a of the bumper reinforce 7 from the front side. Then, as shown in FIG. 6, the bumper reinforce 7 moves rearward together with the gusset 13 while crushing the side member main body 3 in the axial direction thereof.

In that case, the bumper reinforce 7 turns about the front end portion of the side member main body 3 on the other side of the collision side, so that the gusset 13 moves toward the rear side of the vehicle body and inward in the vehicle width direction (in the direction of arrow C in FIG. 4). As a result, the collision load acting in the moving direction of the gusset 13 removes the temporary attachment member 17 (not shown in FIG. 4), and the gusset 13 keeps moving in the moving direction so that a rear corner portion 13g thereof comes into contact with and is received by the receiving surface 21a of the catcher 21.

The rear corner portion 13g of the gusset 13 also comes into contact with the outside surface of the side member main body 3 so as to apply an inward load in the vehicle width direction to the mount portion 25 of the side member main body 3.

Figure 7:
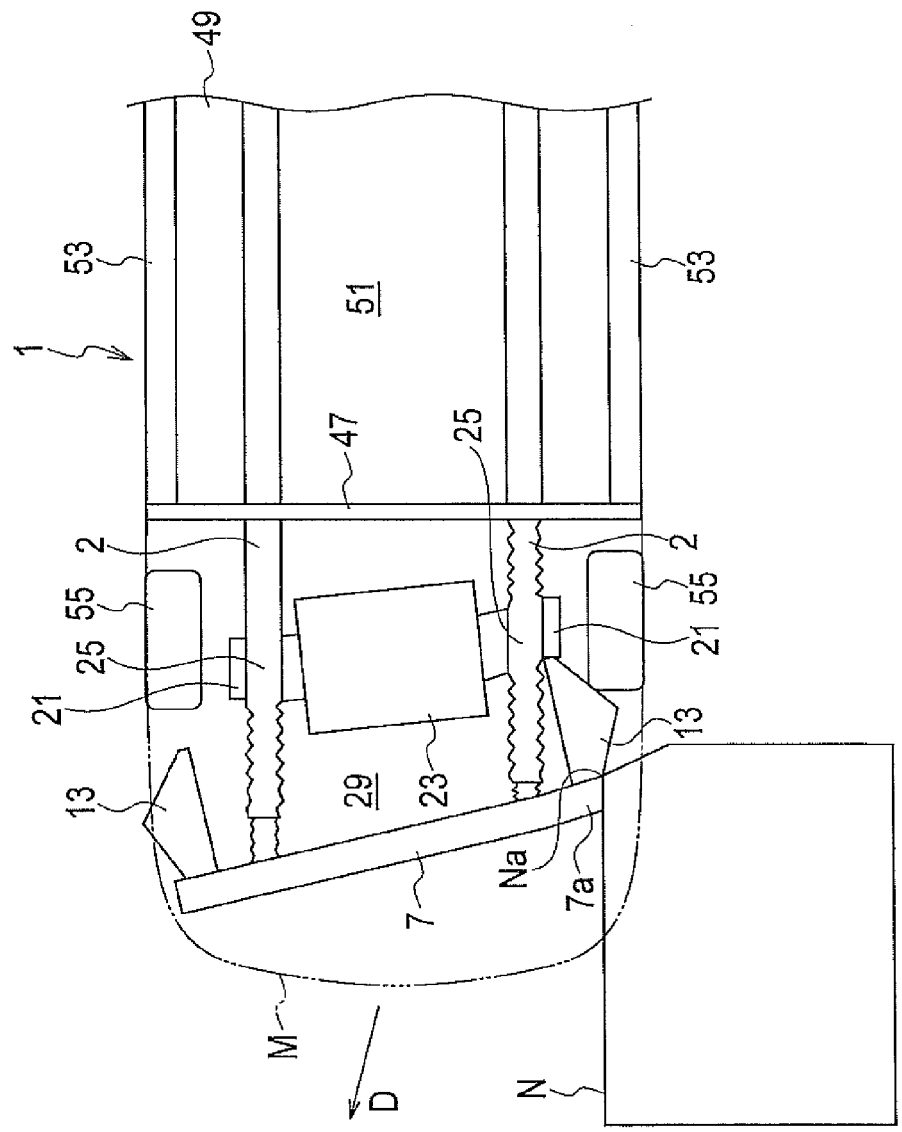
FIG. 7 is an action explanatory view showing a state in which the vehicle moves in a diagonally forward right direction with respect to the obstacle in a manner such that the obstacle is guided by an inclined portion of the gusset, in comparison to the state shown in FIG. 6.

Thereafter, as shown in FIG. 7, the gusset 13 further moves rearward in association with the rearward movement of the bumper reinforce 7, and the crush of the side member main body 3 further progresses. In this case, part of the side member main body 3 located on the rear side of the mount portion 25 is also slightly crushed. However, the catcher 21 keeps receiving the gusset 13 so as to prevent deformation of the vehicle interior 51 which is a space for passengers located on the rear side of the dash panel 47.

Here, only a corner portion of the gusset 13 adjacent to the square column 19z located on the outer side in the vehicle width direction and having a triangular shape, comes into contact with the front wheel 55 on the collision side. Therefore, the rearward movement of the front wheel 55 is minimized so that deformation of the vehicle interior 51 because of the front wheel 55 on the collision side is prevented.

In addition, a corner portion Na of the obstacle N on the right side as viewed from the traveling direction of the vehicle M (on the upper side in FIG. 7) comes into contact with and is guided by the front inclined surface 13b of the gusset 13 from the projecting end 7a of the bumper reinforce 7, and then moves toward the rear side of the vehicle M and diagonally outward in the vehicle width direction along the front inclined surface 13b. In other words, the vehicle M moves in the direction indicated by arrow D, that is, moves forward and in the diagonally right direction away from the obstacle N. As a result, a direct impact of the obstacle N on the vehicle M is reduces so as to protect the vehicle interior 51 more reliably.

Such a movement of the vehicle M in the diagonally forward right direction is promoted by energy which moves the vehicle body 1 in the lateral direction (upward in FIG. 6). This energy is generated when the gusset 13 comes into contact with the outside surface of the side sill 53 in the direction of arrow C shown in FIG. 4.

Figure 8:
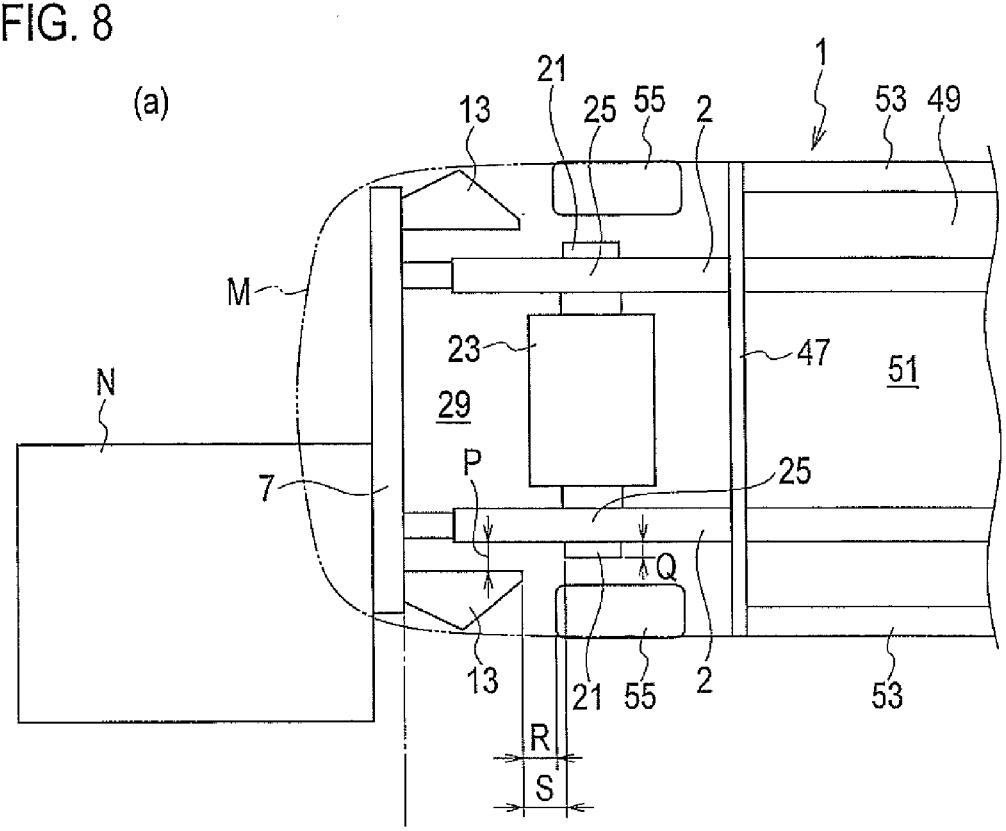
FIGS. 8(a) and 8(b) are action explanatory views showing a state in which the obstacle comes into collision with a front left portion of the vehicle on the inside of a side member in the vehicle width direction.
Figure 8:
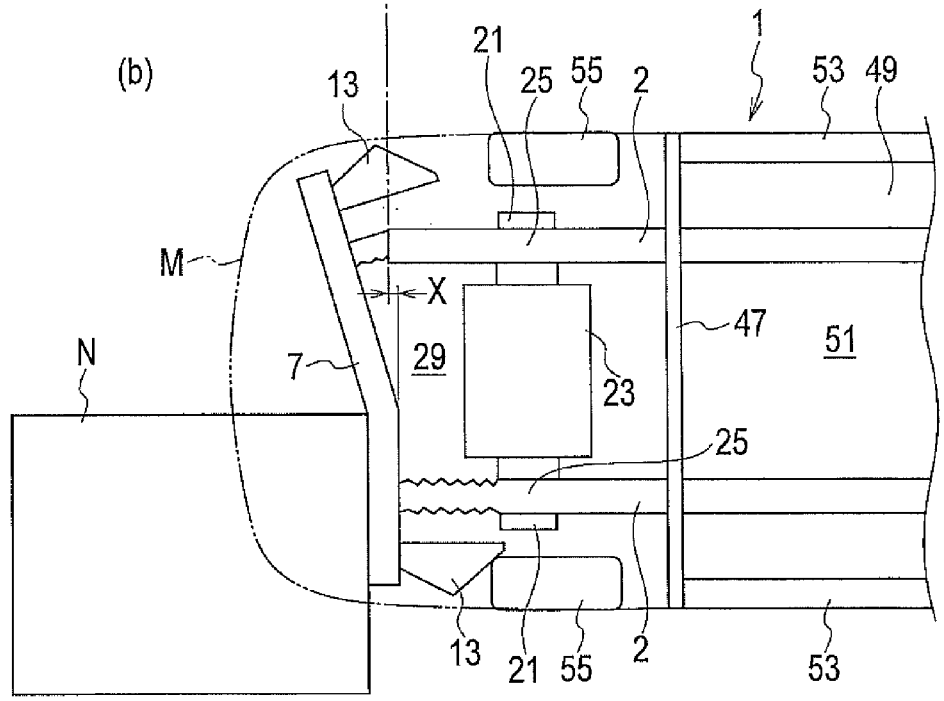

FIG. 8 shows deformation of the vehicle body 1 at the time of a small lap collision in which the vehicle M having the above-described front structure of the vehicle body according to the present embodiment comes into collision with the obstacle N from the front side at a position on the inner side of the side member main body 3 in the vehicle width direction. For example, as shown in FIG. 8(*a*), when the obstacle N comes into collision with the vehicle M on the left side at a position on the inner side of the side member main body 3 in the vehicle width direction, the obstacle N bends the bumper reinforce 7 and crushes the side member main body 3 located on the rear side of the bumper reinforce 7, as shown in FIG. 8(*b*).

The gusset 13 then moves rearward on the outside of the catcher 21 on the opposite side of the side member main body 3 so as to prevent the gusset 13 from interfering with the catcher 21. In particular, the gap P between the gusset 13 and the side member main body 3 in the vehicle width direction is set to be greater than the amount of projection Q of the catcher 21 projecting outward from the side member main body 3 in the vehicle width direction.

The crush of the side member main body 3 absorbs a load at the time of collision so that deformation of the vehicle interior 51 is prevented. In order to allow the side member main body 3 to be crushed and deformed, the gap R between the rear end of the gusset 13 and the front end of the front wheel 55 and the gap S between the rear end of the gusset 13 and the front end of the catcher 21 before the crush deformation shown in FIG. 8(*a*), are set to be greater than the amount of collapse X of the side member main body 3 at the time of crush (collapse) shown in FIG. 8(*b*).

Namely, by fulfilling the condition of X<R, the amount of collapse X of the side member main body 3 can be ensured before the gusset 13 interferes with the front wheel 55. In addition, by fulfilling the condition of X<S, the amount of collapse X of the side member main body 3 on the front side of the catcher 21 can be ensured so that the side member main body 3 can absorb the impact at the time of collision.

Accordingly, in the present embodiment, even when the gusset 13 and the catcher 21 are equipped in order to prevent deformation of the vehicle interior 51 at the time of the minimal lap collision shown in FIG. 4, FIG. 6 and FIG. 7, the impact absorption capacity by the crush of the side member main body 3 at the time of the small lap collision shown in FIG. 8 can also be ensured.

According to the present embodiment described above, once a collision load is applied to the bumper reinforce 7 from the front side of the vehicle body at the time of a minimal lap collision, the gusset 13 serving as a load transmission member moves rearward together with the bumper reinforce 7. When the gusset 13 moves rearward, the catcher 21 serving as a receiving portion placed on the side member main body 3 receives the gusset 13.

Here, the side member main body 3 is provided with the reinforcing portion located at a position corresponding to the catcher 21 to increase the strength thereof. Therefore, deformation of the side member main body 3 is prevented so that the catcher 21 can keep receiving the gusset 13 and increase the strength thereof to receive the gusset 13. As a result, the bumper reinforce 7 can be prevented from further moving rearward so as to protect the inside of the vehicle interior 51 which is a space for passengers located toward the rear side of the vehicle.

The reinforcing portion described above is obtained in a manner such that the reinforce members 43 and 45 are simply placed on the side member main body 3. Therefore, the strength of the position corresponding to the catcher 21 is improved so that the bumper reinforce 7 can be prevented from further moving rearward more easily.

The reinforcing portion of the side member main body 3 is located at a position corresponding to the fixing portion for the power train unit 23 on the side member main body 3. Therefore, the reinforcing portion located at the position corresponding to the strengthened fixing portion can increase the strength of the catcher 21 to receive the gusset 13. In addition, the bumper reinforce 7 can be prevented from further moving rearward more reliably.

According to the present embodiment, the gusset 13 includes, on the outer side thereof in the vehicle width direction, the front inclined surface 13*b* which is an inclined portion inclined outward in the vehicle width direction from the front side thereof toward the rear side of the vehicle body. When the obstacle N comes into contact with the front inclined surface 13*b* from the front side, the vehicle M moves in the diagonally forward right direction away from the obstacle N, so as to prevent the bumper reinforce 7 from moving toward the rear side of the vehicle body and protect the vehicle interior 51 accordingly.

The present invention is not limited to the embodiment described above, and various modifications and improvements can be made without departing from the scope of the present invention.

According to the present invention, once a collision load is applied to the bumper reinforce from the front side of the vehicle body, the load transmission member moves rearward together with the bumper reinforce. Then, the receiving portion placed on the side member receives the load transmission member. The receiving portion is located at a position corresponding to the reinforcing portion placed on the side member. Therefore, the strength of the receiving portion to receive the load transmission member can be improved at the time of front collision at a position on the outside of the side member in the vehicle width direction.

The invention claimed is:

1. A front structure of a vehicle body comprising:
a side member placed along a side extending in a front-rear direction of the vehicle body;
a bumper reinforce extending in a vehicle width direction and connected to an end portion of the side member toward a front side of the vehicle body;
a load transmission member placed at an end portion of the bumper reinforce in the vehicle width direction, temporarily attached to the side member with a temporary attachment member and projecting toward a rear side of the vehicle body;
a receiving portion placed on the side member to receive the load transmission member when the load transmission member receives an impact load from the front side of the vehicle body and moves toward the rear side of the vehicle body; and
a reinforcing portion placed on the side member at a position corresponding to the receiving portion,
wherein a gap in the vehicle width direction between an inner side surface of the load transmission member in the vehicle width direction and an outer side surface of the side member in the vehicle width direction is set to be greater than an amount of projection of the receiving portion projecting outward in the vehicle width direction from outer side surface of the side member in the vehicle width direction.

2. The front structure of the vehicle body according to claim 1, wherein the reinforcing portion is a reinforce member placed on the side member.

3. The front structure of the vehicle body according to claim 1, wherein the reinforcing portion is placed at a position corresponding to a fixing portion where a power train is fixed to the side member.

4. The front structure of the vehicle body according to claim 1, wherein the load transmission member includes, on an outer side thereof
in the vehicle width direction, an inclined portion inclined outward in the vehicle width direction from a front portion to a rear portion in the front-rear direction of the vehicle body.

* * * * *